United States Patent [19]

Curry et al.

[11] 3,920,807

[45] Nov. 18, 1975

[54] ANTIPERSPIRANT AND DEODORANT COMPOSITIONS

[75] Inventors: Kenneth Vasey Curry, Camberley; Ahamado Ismail Sahir, Isleworth, both of England

[73] Assignee: Lever Brothers Company, New York, N.Y.

[22] Filed: Jan. 22, 1975

[21] Appl. No.: 543,403

Related U.S. Application Data

[63] Continuation of Ser. Nos. 393,097, Aug. 29, 1973, abandoned, and Ser. No. 169,100, Aug. 4, 1971, abandoned.

[30] Foreign Application Priority Data

Aug. 18, 1970 United Kingdom............... 70/39690
Oct. 22, 1970 United Kingdom............... 70/50187

[52] U.S. Cl..................................... 424/46; 424/47
[51] Int. Cl.²...................... A61K 9/14; A61K 7/00
[58] Field of Search............................... 424/47, 46

[56] References Cited
UNITED STATES PATENTS

| | | | |
|---|---|---|---|
| 2,823,169 | 2/1958 | Brown et al. | 424/47 |
| 3,194,735 | 7/1965 | Brechner | 8/10.1 |
| 3,288,681 | 11/1966 | Goldberg et al. | 424/46 |
| 3,303,138 | 2/1967 | Dewitt et al. | 252/152 |
| 3,420,932 | 1/1969 | Jones et al. | 424/47 |
| 3,433,868 | 3/1969 | Brechner et al. | 424/47 |
| 3,444,226 | 5/1969 | Schmank et al. | 424/47 |

FOREIGN PATENTS OR APPLICATIONS

| | | |
|---|---|---|
| 933,684 | 8/1963 | United Kingdom |
| 1,013,386 | 12/1965 | United Kingdom |
| 1,167,173 | 10/1969 | United Kingdom |

OTHER PUBLICATIONS

Chemical Abstracts, Vol. 60, 1535a.
Sagarin, Cosmetics Science & Technology, p. 446, 1957, Interscience Publishers, Inc., N.Y., New York.

*Primary Examiner*—Donald B. Moyer
*Attorney, Agent, or Firm*—Arnold Grant, Esq.

[57] ABSTRACT

An aerosol antiperspirant or deodorant composition free from anticholinergic compounds containing, as a non-staining emollient substance or dispersing agent, hexylene glycol. The compositions may be solutions or suspensions and may contain germicides and antiperspirant agents.

A preferred form of the invention is a powder aerosol antiperspirant composition containing hexylene glycol as the dispersing agent. The following formulation is typical of such compositions:

| | % by weight |
|---|---|
| Aluminium chlorhydrate | 2 to 7.5 |
| Colloidal silica bulking agent | 0.05 to 0.75 |
| Hexylene glycol | 1 to 5 |
| Hexachlorophene | up to 0.5 |
| Perfume | 0.01 to 2 |
| Aerosol propellant | balance |

The invention also relates to a process for making such a composition.

1 Claim, No Drawings

ANTIPERSPIRANT AND DEODORANT COMPOSITIONS

This is a continuation of application Ser. No. 393,097, filed Aug. 29, 1973, and Ser. No. 169,100, filed Aug. 4, 1971, both now abandoned.

BACKGROUND OF INVENTION

1. Field of the Invention

This invention relates in a first aspect to an aerosol antiperspirant or doodorant composition, and in a second aspect to a process for making certain of the compositions.

2. Description of the Prior Art

Aerosols of the type described in British Patent Specification No. 1,167,173 in which a finely-divided antiperspirant agent such as aluminium chlorhydrate is dispersed by means of a non-volatile, non-hygroscopic liquid in an aerosol propellant are now widely used. As described in the above-referenced patent specification, suitable non-volatile, non-hygroscopic liquids for use as dispersing agents in combination with the liquefied propellant are essentially non-polar organic liquids having amongst other properties a water-immiscibility such that they dissolve not more than 5 percent of water at 70°F. Examples of such materials are hydrophilic oils such as hydrocarbon oils exemplified by tetradecane; organic esters such as isopropyl myristate and glyceryl triolcate; alcohols such as lauryl alcohol; carboxylic acids such as oleic acid and silicone oils such as the dimethylpolysiloxanes. As far as we are aware, only isopropyl myristate has been used in the aerosols of the type described which are available commercially.

These aerosol antiperspirant compositions containing isopropyl myristate cause staining of clothing because of transfer of the composition from the skin to the clothing build-up of a deposit and discolouration of the deposit. This staining is particularly prevalent on clothing adjacent the axillac, for instance on shirts, blouses and brassieres.

BRIEF SUMMARY OF THE INVENTION

It is an object of this invention to provide new aerosol antiperspirant and deodorant compositions which are substantially non-staining and yet which contain a substance having emollient properties to reduce the tendency of these compositions to irritate the skin.

It is also an object of this invention to provide substantially non-staining aerosol antiperspirant compositions containing dispersed, finely divided astringent metal salt.

It is a further object of this invention to provide new aerosol antiperspirant and deodorant compositions having a reduced tendency to build-up on clothing despite regular laundering.

It is a still further object of this invention to provide new aerosol antiperspirant and deodorant compositions having a reduced tendency to stain clothing.

Yet further objects of this invention are to provide new aerosol antiperspirant and deodorant compositions leaving a non-greasy film on the skin and to provide new aerosol compositions having deodorant activity without the use of conventional germicides.

It is also an object of the invention to provide a process for preparing an aerosol antiperspirant composition containing aluminium chlorhydrate which avoids wastage of the chlorhydrate and facilitates easy dispersion of the chlorhydrate in the liquid medium of the composition.

We have now discovered that these objects can be achieved by formulating an antiperspirant or deodorant composition using hexylene glycol as the substance having emollient and dispersing properties.

Accordingly, in its broadest aspect the invention provides an aerosol antiperspirant or deodorant composition free from anticholinergic compounds comprising a solution of a substance having emollient properties in an aerosol propellant wherein the emollient properties are imparted to the composition by the inclusion therein of from about 0.5 to 10 percent by weight of hexylene glycol whereby a substantially non-staining composition is obtained.

In a second aspect the invention also provides an aerosol antiperspirant composition comprising a dispersion of a finely divided astringent metal salt in a solution of a substance having dispersing and emollient properties, in an aerosol propellant wherein the dispersing and emollient properties are imparted to the antiperspirant composition by the inclusion therein of from about 0.5 to 10 percent by weight of hexylene glycol whereby a substantially non-staining antiperspirant composition is obtained.

In general, the amount of hexylene glycol required in the composition is from about 0.5 to 8 or even 10 percent, preferably 1 to 5 percent by weight. This is rather less than is required when isopropyl myristate is used as the emollient substance or dispersing agent.

Typically, a so-called powder antiperspirant composition according to the invention consists essentially of from 0.2 to 10 percent, preferably 2 to 7.5 percent by weight of a finely divided astringent metal salt, for example aluminium chlorhydrate, from about 0.01 to 2 percent, preferably 0.05 to 0.75 percent by weight of a bulking agent, for example a silica bulking agent, up to 0.5 percent and preferably 0.01 to 0.5 percent by weight of a germicide, from 0.01 to 2 percent by weight of a perfume and from 0.5 to 10 percent, preferably 1 to 7 percent and most preferably 1 to 5 percent by weight of hexylene glycol, the balance being an aerosol propellant.

Although the use of hexylene glycol produces an antiperspirant composition which is a great improvement over known products certain difficulties can occur during commercial manufacture of the composition. This is particularly so in factories where it is required that a stock of an aluminium chlorhydrate/hexylene glycol slurry should be stored over an extended period of time before being combined with the aerosol propellant, which combining is usually effected in the aerosol units. In these circumstances it is found that there is a tendency for the aluminium chlorhydrate to deposit at the bottom of the storage vessel in the form of a coherent mass which cannot be redispersed in the hexylene glycol. We have now discovered that this tendency can be substantially inhibited by including a surfactant in the slurry.

Accordingly, in a second aspect of this invention there is provided a process for preparing an aerosol antiperspirant composition which contains finely divided aluminium chlorhydrate dispersed in a solution of hexylene glycol in an aerosol propellant and which contains a surfactant soluble in said solution and chemically compatible with the components of the composition, which process comprises:

a. forming a solution of said surfactant in hexylene glycol;
b. combining said solution with aluminium chlorhydrate to form a slurry; and
c. combining said slurry with an aerosol propellant to form an aerosol antiperspirant composition.

The physical form of the aerosol deodorant and antiperspirant compositions of the invention may be that of the so-called powder antiperspirant or it may be an aqueous, alcoholic or aqueous/alcoholic solution. In one form, an antiperspirant composition according to the invention comprises from about 1 to about 75 percent by weight of a $C_1$–$C_4$ alcohol and an alcohol-soluble antiperspirant agent.

Any one of the large number of materials which have been proposed for use as astringent antiperspirant agents may be used in the compositions of this invention although, in the case of powder antiperspirant compositions, the antiperspirant agent should be capable of formulation as a dispersion in the antiperspirant medium. Thus any antiperspirant agent which is soluble in the commonly used aerosol propellants referred to below is excluded from use in these compositions since it will not be capable of formulation as a dispersion.

Examples of suitable antiperspirant agents containing the zinc ion are zinc chloride, zinc sulfate, zinc sulfocarbolate and zinc stearate.

Suitable aluminium salts are aluminium acetotartrate, acetyl acetonate, chloride, chlorhydrate, chlorohydroxylactate, citrate, tartrate, phenolsulfonate, sulfate, sulfamate, sulfocarbolate, gluconate, glycolate, lactate, benzoate and salicylate.

Iron and zirconium salts may also be used for example ferric chloride and zirconium (IV) sulfate.

Astringent metal salts and in particular aluminium salts are preferred as the antiperspirant agents of the invention. Most preferred is finely divided aluminium chlorhydrate. Grades of aluminium chlorhydrate which we have found particularly suitable in the compositions of this invention are those sold under the trade mark "Chlorhydrol" by the Reheis Chemical Company, a Division of the Armour Pharmaceutical Company, of 111 East Wacker Dr., PO Box 1022, Chicago, Ill. Detailed specifications of these grades are described in the booklet entitled "Chlorhydrol" published by the manufacturer in 1970.

Antiperspirant compositions of the solution type referred to above preferably contain an alcohol-soluble antiperspirant agent which is a complex salt of aluminium. Another alcohol-soluble antiperspirant agent which is particularly useful is zinc phenolsulphonate.

Powder aerosol antiperspirants commonly contain a bulking agent to help prevent irreversible settling of the finely-divided astringent metal salt and to ease its passage through the valve.

Any powder that is lower in bulk density than about 200 kilos per cubic meter may be used as the bulking agent, provided that it is insoluble in the liquid medium of the composition. Powders with a bulk density of 15 to 75 kilos per cubic meter are preferred.

The nature of the bulking agent is not critical to the invention. Examples of suitable bulking agents are finely-divided silicas, variously known as colloidal, fumed and pyrogenic silicas, and hydrophobic clays. Talc may also be used, as may grease-forming soaps such as aluminium stearate.

Specific finely divided silicas for use in the composition of the invention are silica No. 22, referred to in U.S. Pat. No. 3,081,223 which is incorporated herein by reference; submicroscopic particulate silicas prepared in a hot gas environment (1,100°C) by the vapour phase hydrolysis of a silicon compound and available from the Cabot Corporation, Boston, Mass.; reaction products of montmorillonite and dimethyl-octadecyl ammonium chloride, the latter constituting one third of the compound; and pyrogenic silicas manufactured by Deutsche Gold und Silberscheideanstalt of Frankfurt, West Germany. These bulking agents are preferably present in the compositions of the invention in amounts of from 0.01 to 2 percent.

Optionally the antiperspirant compositions of the invention may contain a germicide. If a germicide is included then it will be in an amount of from about 0.01 to 0.5 percent by weight, depending on the degree of its germicidal activity. However, we have discovered that hexylene glycol itself can provide the composition with slight deodorant activity and so the use of a germicide is not obligatory.

The following general classes illustrate some of the germicide-types which are applicable to the compositiors of this invention, although the constitution of the germicide is not critical and others outside these classes may be used: the halogenated salicylanilides, halogenated carbanilides, halogenated phenols and bisphenols, sodium $C_5$–$C_{12}$ alkylbenzoylacrylates, quaternary ammonium compounds, thiuram sulfides, dithiocarbamates, halogenated diphenyl ethers, halogenated anilides of thiophene carboxylic acids and esters of hydroxybenzoic acids.

Specific examples of germicides falling within the above classes are 3,4',5-tribromosalicylanilide, 4:3':4'-trichlorosalicylanilide, 3,4,4'-trichlorocarbanilide, 4-chloro-3:5 dimethyl phenol (parachlormetaxylenol), 2:4 dichloro-3,5 dimethyl phenol (dichlormetaxylenol), 2,2'-methylenebis(3,4,6-trichlorophenol) (hexachlorophene), 2',2'methylenebis-(4-chlorophenol (dichlorophene), 2',2'-thiobis(4,6-dichlorphenol) (actamer), cetyltrimethyl ammonium bromide, lauryl pyridinium bromide, disodium ethylene bisdithiocarbamate, and tetramethyl thiuram disulfide.

Although, as stated above, any suitable germicide can be used in the antiperspirant compositions of the invention, we prefer to use hexachlorophene, chlorhexidine, dichlorophene, and quaternary ammonium compounds such as cetyltrimethyl ammonium bromide.

The antiperspirant and deodorant compositions can contain perfumes in conventional amounts, for example 0.01 to 2 percent.

The compositions of this invention are dispensed from a conventional aerosol can by means of a volatile aerosol propellant. In general the propellant or mixture thereof is chosen to produce a pressure of about 15 to 75, preferably about 25 to 55, and more preferably about 35 p.s.i.g. in the headspace of the can.

Typical of the halogenated hydrocarbons which can be used are the following compounds: trichlorofluoromethane, dichlorodifluoromethane and symmetrical dichlorotetrafluoroethane.

Petroleum hydrocarbons such as propane and isopropane, n-butane and isopentane may also be used.

Further examples of aerosol propellants, the choice of which is not essential to the present invention are listed in Pressurised Packaging (Aerosols) by A. Herzka and J. Pickthal published by the Academic Press Inc. 111 Fifth Ave., New York which is incorporated herein by reference.

As stated above in the process of manufacture of an aerosol antiperspirant composition according to the invention formulated with aluminium chlorhydrate as the astringent metal salt it is preferable to include a surfactant in the composition.

The surfactant should be both soluble in the antiperspirant medium which consists essentially of a solution of hexylene glycol in an aerosol propellant and chemically compatible with the other components of the composition. Once this requirement is satisfied the precise nature of the surfactant is not critical to the invention. Some suitable surfactants for use in the process and powder aerosol antiperspirant compositions of the invention are described in "Surface Active Agents and Detergents" by A. M. Schwartz, W. Perry and J. Berch, published by Interscience Publishers, Inc. New York and this work is incorporated herein by reference.

We prefer to use nonionic surfactants in the process and compositions referred to although cationic and anionic surfactants can also be used. We have found the propylene glycol/ propylene oxide condensates to be suitable nonionic surfactants for use in the invention. Other nonionic surfactants which we have found to be suitable are polyoxyethylene lauryl ethers, polyoxyethylene cetyl ethers, water-soluble lanolins, polyoxyethylene stearates and the mono-fatty acid esters of ethylene oxide/sorbitan condensates such as polyoxyethylene sorbitan monolaurates, polyoxyethylene sorbitan monopalmitates, polyoxyethylene sorbitan monostearates and polyoxyethylene sorbitan mono-oleates.

Amongst those cationic surfactants which are suitable for use in the process and compositions of the invention are the quaternary ammonium salts as cetyl trimethyl ammonium chloride and stearyl dimethyl benzyl ammonium bromide.

An alkali metal alkyl ether sulfate, such as an aqueous solution of sodium lauryl ether sulfate containing an average of 3 ethylene oxide units per molecule is an example of a suitable anionic surfactant.

Typical amounts of surfactant for use in the process of the invention are from about 0.01 to about 0.5 or even 1.5 percent by weight of the final product, the preferred range being from about 0.02 to 0.2 or even 0.4 by weight. Expressed another way, the surfactant should preferably be present in the slurry at a level of about 0.3 to 3 or even 6 percent by weight.

DETAILED DESCRIPTION OF THE INVENTION

The following examples are intended to be illustrative only and in no way limit the invention which is defined solely by the appended claims.

EXAMPLE 1

This example illustrates a typical process for preparing an aerosol antiperspirant composition containing aluminum chlorhydrate and a formulation of such an antiperspirant.

1 part by weight of hexachlorophene and 2 parts by weight of a surfactant are dissolved in 20 parts of hexylene glycol together with the required amount of perfume. From 1 to 2 parts of a pyrogenic silica are then suspended in the solution and, after thorough mixing, 35 parts of finely divided aluminum chlorhydrate are added and mixed in to form a slurry.

A portion of the slurry formed in this way is dispensed into an aerosol unit and a propellant is added by the throughbutton filling method to form an antiperspirant according to the invention having the following composition:

|  | % by weight |
| --- | --- |
| Aluminum chlorhydrate | 3.1 |
| Pyrogenic silica | 0.1 |
| Hexylene glycol | 1.8 |
| Hexachlorophene | 0.1 |
| Perfume | 0.4 |
| Propellant 11 | 61.6 |
| Propellant 12 | 32.7 |
| Surfactant | 0.2 |

It has been found that if a surfactant is incorporated in the slurry, as described above, it is possible to allow the slurry to stand for substantially longer periods of time prior to its being dispensed into an aerosol unit than is the case if the surfactant is omitted. We have found that if the surfactant is omitted the slurry forms a coherent mass in the bottom of the storage vessel within one or two days at the most.

Although in the above example of the process according to the invention the aerosol propellant is added to the slurry at a late stage by means of through-button filling, it will be understood that it may be added at earlier stages and by different methods without excluding the process from the scope of the invention. For example, if desired, propellants which are liquid at room temperature and pressure can be added to the preformed slurry prior to its being dispensed into aerosol units.

The above process avoids wastage of the aluminium chlorhydrate due to formation of a coherent mass and also facilitates dispersion of the chlorhydrate in the liquid medium.

EXAMPLE 2

This is a comparative example of a prior art aerosol antiperspirant composition containing isopropyl myristate.

|  | % by weight |
| --- | --- |
| Aluminium chlorhydrate | 3.5 |
| Hexachlorophene | 0.1 |
| Isopropyl myristate | 5.5 |
| Pyrogenic silica | 0.1 |
| Perfume | 0.5 |
| Propellants 12/11 (65:35) | 90.3 |

EXAMPLE 3

This example illustrates a formulation according to the invention not including a surfactant.

|  | % by weight |
| --- | --- |
| Aluminium chlorhydrate | 3.5 |
| Pyrogenic silica | 0.1 |
| Hexylene glycol | 2.0 |
| Hexachlorophene | 0.1 |
| Perfume | 0.4 |
| Propellant 11 | 61.0 |
| Propellant 12 | 32.9 |

The advantages of the above composition are that it is not as easily transferred from the skin to the clothing as are compositions containing such fatty suspending agents as isopropyl myristate, and that even when it is transferred it is easily removed by washing. Both of these features result in the compositions of the invention having a much lower staining potential than compositions containing isopropyl myristate.

EXAMPLE 4

This experiment was performed to demonstrate that an aerosol antiperspirant of the formula in Example 3 is less easily transferred to clothing than is one of the formula in EXAMPLE 2.

Each aerosol was sprayed from a standard distance and for 2 seconds onto the inner side of the forearm so that the antiperspirant composition covered a circular area of about 5 cm in diameter. The composition was allowed 2 minutes to dry, after which time a weighed piece of cotton of about 5 cm diameter was placed on the sprayed area and covered by a 500 g. weight. After 15 minutes the weight was removed and the cotton was weighed to discover the amount of antiperspirant transferred from the skin.

The results were as follows:

| | |
|---|---|
| Aerosol antiperspirant of Example 2 | 4.0 mg/cm$^2$ |
| Aerosol antiperspirant of Example 3 | 0.5 mg/cm$^2$ |

This result indicates the reduction in transfer from skin to clothing which is produced when the isopropyl myristate in an aerosol antiperspirant is replaced by hexylene glycol.

EXAMPLE 5

A similar experiment to that described in the previous example was performed with an aerosol antiperspirant composition having the following composition.

| | % by weight |
|---|---|
| Aluminium chlorhydrate | 3.5 |
| Hexachlorophene | 0.1 |
| Hexylene glycol | 2.0 |
| Propylene glycol/propylene oxide condensate | 0.1 |
| Pyrogenic silica | 0.1 |
| Perfume | 0.4 |
| Propellant of Example 2 | 93.8 |

The addition of the nonionic surfactant did not affect the transference properties of the antiperspirant containing hexylene glycol.

The formulations of Examples 1, 3 and 5 dried quickly to form a non-greasy film on the skin, whereas the film left by the formulation of Example 2 was greasy.

EXAMPLE 6

The following experiment was performed to demonstrate the ease with which an aerosol antiperspirant of the formula in Example 5 can be removed from a fabric compared with an antiperspirant of the formulation in Example 2.

Each antiperspirant was sprayed onto a separate portion of the flexor surface of the forearm for 2 seconds so that the composition covered a circular area of about 5 cm in diameter. After a delay of 2 minutes to allow the composition to dry, a piece of accurately weighed pre-washed cotton was rubbed over the sprayed area using 5 strokes to give maximum pick-up of each composition and re-weighed. The fabric was then hand washed in 2 litres of water maintained at 40°C containing 10 g of a commercial detergent powder. The washing process consisted of squeezing the impregnated cotton 10 times and then rinsing it. It was then dried in an oven maintained at 64°C for 30 minutes and re-weighed. The results were as follows:

| | Example 5 | Example 2 |
|---|---|---|
| Mean weight of composition on fabric before washing | 0.0793 | 0.0975 |
| Mean weight of composition on fabric after washing | 0.0010 | 0.0113 |
| Mean percentage product left on fabric after washing | 1.25% | 11.0% |

This result shows that an antiperspirant formulated with hexylene glycol according to the invention is more easily removable from fabric by washing than is a conventional antiperspirant formulated as in Example 2 with isopropyl myristate. It was not possible to carry out the experiment over more than one spray-wash cycle since weight losses due to fraying of the fabric were too great. However, it can be appreciated from the experiment that the build-up of composition left on the fabric after, say, five spray-wash cycles is very considerably greater in the case of an isopropyl myristate-containing antiperspirant than in the case of a hexylene glycol-containing one according to this invention. The build-up of unremovable product leads to staining.

EXAMPLE 7

This experiment was performed to demonstrate the difference between an antiperspirant formulated according to the invention and one formulated with isopropyl myristate as regards the stain which they produce in everyday use.

The experiment involved a panel of four persons. Each person was supplied with samples of the antiperspirant of Example 2 and of the antiperspirant of Example 5. Two of the persons used the antiperspirant of Example 2 on the left arm and that of Example 5 on the right whilst in the case of the two remaining persons the antiperspirants were used in the opposite way.

The persons were asked to apply the antiperspirants at home before wearing a white shirt which was supplied to them. Clean shirts were provided daily, a total of three shirts being supplied to each person. The shirt was returned the following day when it was subjectively assessed for underarm staining. Each shirt was then laundered and re-examined before being returned to the person. Each of the shirts was used for a total of six wash-wear cycles.

Subjective assessment of underarm staining was made after 2, 4 and 6 wash/wear cycles by allotting a rating to the shirt as follows:

0 no visible staining
1 very slight staining
2 slight staining
3 marked staining
4 very marked staining In addition to the subjective assessment, a continuous objective assessment was carried out by means of reflectance measurements using an Eel reflectometer, which was calibrated to give a reading of 100 percent reflectance with a standard magnesium carbonate block.

Before any measurements were made and before the shirts were worn, they were washed in order to remove any fabric finishers which may have been applied by the manufacturers, and also to ensure the presence of any optical brighteners which may be used in the laundry's washing process. Reflectance measurements were then taken on the underarm regions of the shirts using a single thickness of material placed over standard light grey tile. Measurements were again taken after the six wash/wear cycles had been completed. All readings were taken from the most severely stained part of the underarm region of the shirt.

The results of the subjective assessment of staining were as follows:

| No of Wash/wear Cycles | Average Staining Index Antiperspirant of Example 2 | Antiperspirant of Example 5 |
| --- | --- | --- |
| 0 | 0 | 0 |
| 2 | 1.40 | 0.15 |
| 4 | 2.70 | 0.45 |
| 6 | 2.95 | 1.30 |

The mean reflectance values for the three shirts of each person participating in the panel before and after the six wash/wear cycles are as follows:

| Person | | Antiperspirant of Example 2 | Antiperspirant of Example 5 |
| --- | --- | --- | --- |
| A | Before washing | 83.8 | 83.6 |
|   | After washing/wearing | 72.2 | 78.6 |
| B | Before washing | 83.5 | 83.3 |
|   | After washing/wearing | 74.0 | 76.6 |
| C | Before washing | 83.3 | 83.5 |
|   | After washing/wearing | 72.6 | 77.5 |
| D | Before washing | 83.3 | 83.4 |
|   | After washing/wearing | 76.1 | 78.2 |
| Mean Values | Before washing | 83.5 | 83.5 |
|   | After washing/wearing | 73.7 | 77.7 |

Both methods of assessing the staining produced by the two antiperspirants show that the formulation of Example 5, that is the one containing hexylene glycol according to the invention, produces less staining than the formulation of Example 2 which contains isopropyl myristate.

EXAMPLE 8

This example illustrates an aerosol deodorant composition according to the invention.

|  | % by weight |
| --- | --- |
| Industrial methylated spirit | 46.9 |
| Hexylene glycol | 3.0 |
| Hexachlorophene | 0.1 |
| Propellants 12/11 (35:65) | 50.0 |

EXAMPLE 9

This example illustrates an aerosol antiperspirant composition according to the invention containing an alcohol-soluble antiperspirant agent.

|  | % by weight |
| --- | --- |
| Aluminum chlorhydrate/propylene glycol complex | 8.0 |
| Industrial methylated spirit | 38.9 |
| Hexylene glycol | 3.0 |
| Hexachlorophene | 0.1 |
| Propellant 114 | 20.0 |

-continued

|  | % by weight |
| --- | --- |
| Propellant 12 | 30.0 |

EXAMPLE 10

This example illustrates an aerosol deodorant composition suitable for feminine intimate hygiene purposes.

|  | % by weight |
| --- | --- |
| Hexylene glycol | 2.0 |
| Perfume | 0.4 |
| Propellant 12 | 97.6 |

EXAMPLE 11

In the following experiment the staining produced by the aerosol deodorant of Example 8 was compared with that produced by a prior art aerosol having the composition:

|  | % by weight |
| --- | --- |
| Industrial methylated spirit | 46.9 |
| Isopropyl myristate | 3.0 |
| Hexachlorophene | 0.1 |
| Propellants 12/11 (35:65) | 50.0 |

Four squares of white poplin A, B, C & D were sprayed at a distance of four inches and for 2 seconds two, A and B, with the deodorant of Example 8 and the other two, C and D, with the prior art composition. Each square was allowed to dry for 15 minutes and was then washed in 2 litres of water containing 10 g of a domestic detergent powder. The squares were thoroughly rinsed, placed on a Whatman Grade 1 filter paper and left to dry in an oven at 40°C for 30 minutes. They were then exposed to ultra-violet light for 2 minutes and examined for staining. This procedure was repeated until the squarer had been sprayed and washed five times. The results were as follows:

| Number of Spray/Wash Cycles | Comments |
| --- | --- |
| 1 | No noticeable staining on either set of squares |
| 2 | Slight staining on C & D noticeable when the squares were ironed, none on A & B |
| 3 | Staining on C and D noticeable in artificial light. None on A and B |
| 4 | Staining on C and D noticeable in |

| Number of Spray/Wash Cycles | Comments |
|---|---|
| 5 | daylight; none noticeable on A and B Pronounced staining on C and D, none noticeable on A and B |

The above results show the reduction in staining which is obtainable by replacing the conventional fatty emollient such as isopropyl myristate in an aerosol deodorant composition with hexylene glycol. Had the tests been performed with coloured material, much more pronounced staining would have occurred with the prior art composition.

EXAMPLE 12

In this experiment, the staining produced by the solution antiperspirant of Example 9 was compared with that produced by a prior art aerosol having the composition:

|  | % by weight |
|---|---|
| Aluminum chlorhydroxide/propylene glycol complex | 8.0 |
| Isopropyl myristate | 3.0 |
| Industrial methylated spirit | 38.9 |
| Hexachlorophene | 0.1 |
| Propellant 114 | 20.0 |
| Propellant 12 | 30.0 |

The experimental procedure was as described in Example 11 except that the spray/wash cycle was performed only four times.

The results showed that even after the first spray/wash cycle there was noticeable staining on the squares which had been sprayed with the prior art composition containing isopropyl myristate as the emollient substance whereas there was no noticeable staining on the squares sprayed with the antiperspirant of Example 9. After the fourth spray/wash cycle a very pronounced stain had appeared on the former squares, consisting of a circular white deposit edged with an oily area, whereas the squares treated with the composition of the invention were free from staining.

The following are further examples of aerosol powder antiperspirant formulations according to the invention having satisfactory low-staining characteristics.

EXAMPLE 13

The aluminium chlorhydrate in Example 5 is replaced by 2.0% of zinc chloride, the amount of hexylene glycol is reduced to 0.9%, and the amount of the propellant is proportionately increased.

EXAMPLE 14

The aluminium chlorhydrate in Example 5 is replaced by 5.0% by aluminium sulphate, the amount of hexylene glycol is increased to 2.5% and the amount of propellant is proportionately reduced.

EXAPLE 15

The aluminium chlorhydrate in Example 5 is replaced by 8.5% of zinc phenolsulfonate, the amount of hexylene glycol is increased to 47% and the amount of propellant is proportionately reduced.

EXAMPLE 16

The hexachlorophene in Example 3 is omitted and the amount of propellant is proportionately increased. This provides an acceptable antiperspirant composition exhibiting deodorant properties.

EXAMPLE 17

The pyrogenic silica in Example 8 is replaced by 0.25% of a hydrophobic bentonite and the amount of propellant is proportionately reduced.

EXAMPLE 18

Hexachlorophene in Example 5 is replaced by 0.25% of chlorhexidine, propylene glycol/propylene oxide condensate is replaced by 0.2% Pluronic L64 and the amount of propellant is proportionately reduced.

EXAMPLE 19

Hexachlorophene in EXAMPLE 5 is replaced by 0.5% by weight of dichlorophene, propylene glycol/propylene oxide condensate is replaced by 0.4% of ESB-3 and the amount of propellant is proportionately reduced.

It will be understood that the compositions of the invention may, if desired, contain small amounts of the conventional dispersing agents and emollients which produce staining although these amounts should not be so large as to detract from the overall non-staining character of the compositions. When a powder antiperspirant composition contains a small amount of isopropyl myristate we prefer it also to contain a polyalkylene glycol as described in our copending British application No. 13827/70.

What is claim is:

1. In an aerosol antiperspirant composition comprising from about 0.2 to 10 weight percent of a finely divided astringent salt selected from the group consisting of zinc, aluminum, iron and zirconium, from about 0.01 to about 2.0 weight percent of a bulking agent having a bulk density of lower than about 200 kilos per cubic meter and an aerosol propellant wherein the improvement comprises making the composition substantially non-staining to clothing by incorporating from about 1.0 to 7.0 weight percent of hexylene glycol into the composition.

* * * * *